(12) United States Patent
Hintzen et al.

(10) Patent No.: US 11,007,835 B2
(45) Date of Patent: May 18, 2021

(54) SPRING ASSEMBLY FOR A VEHICLE SUSPENSION

(71) Applicant: FORD GLOBAL TECHNOLOGIES, LLC, Dearborn, MI (US)

(72) Inventors: Ralf Hintzen, Aachen (DE); Daniel Mainz, Herzogenrath (DE); Rainer Souschek, Aachen (DE); Thomas Gerhards, Niederzier (DE); Paul Zandbergen, Wuerselen (DE); Alberto Girelli Consolaro, Aachen (DE); Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 16/151,951

(22) Filed: Oct. 4, 2018

(65) Prior Publication Data

US 2019/0100067 A1    Apr. 4, 2019

(30) Foreign Application Priority Data

Oct. 4, 2017 (DE) .................. 10 2017 217 598

(51) Int. Cl.
*B60G 11/04* (2006.01)
*F16F 1/22* (2006.01)
(Continued)

(52) U.S. Cl.
CPC ............. *B60G 15/066* (2013.01); *B60G 9/02* (2013.01); *B60G 11/04* (2013.01); *B60G 17/08* (2013.01);
(Continued)

(58) Field of Classification Search
CPC ...... B60G 11/46; B60G 15/066; B60G 11/04; B60G 15/06; B60G 17/0275; F16F 1/22;
(Continued)

(56) References Cited

U.S. PATENT DOCUMENTS 1,182,181 A      5/1916  Laycock
2,932,506 A  *   4/1960  Mather ..................... F16F 1/22
                                                            267/44
(Continued)

FOREIGN PATENT DOCUMENTS

DE        10141432 A1    3/2003
DE        10352315 A1    6/2005
(Continued)

OTHER PUBLICATIONS

Machine translation of DE 102009054458 (Year: 2020).*
(Continued)

*Primary Examiner* — Barry Gooden, Jr.
(74) *Attorney, Agent, or Firm* — Raymond L. Coppiellie; Brooks Kushman P.C.

(57) ABSTRACT

The disclosure concerns a spring assembly with a leaf spring. The leaf spring extends in a vehicle longitudinal axis, supports a vehicle axle and is connected at least indirectly to a vehicle superstructure at a front end and at a rear end. In order to provide a wheel suspension with advantageous springing and damping behavior that is optimized with regard to weight and complexity, according to the disclosure it is provided that at least one damping region, which is at least partially fluid-filled, is integrated in the leaf spring.

15 Claims, 4 Drawing Sheets

(51) Int. Cl.
*B60G 15/06* (2006.01)
*F16F 1/00* (2006.01)
*B60G 9/02* (2006.01)
*B60G 17/08* (2006.01)

(52) U.S. Cl.
CPC ............ *F16F 1/00* (2013.01); *B60G 2200/32* (2013.01); *B60G 2202/11* (2013.01); *B60G 2202/112* (2013.01); *B60G 2202/116* (2013.01); *B60G 2202/31* (2013.01); *B60G 2206/428* (2013.01); *B60G 2206/72* (2013.01); *B60G 2500/10* (2013.01); *B60G 2800/162* (2013.01)

(58) Field of Classification Search
CPC ...... F16F 1/368; F16F 5/00; F16F 6/00; F16F 7/124; F16F 13/08
See application file for complete search history.

(56) References Cited

U.S. PATENT DOCUMENTS

| | | | |
|---|---|---|---|
| 4,923,057 A * | 5/1990 | Carlson | E04B 1/98 188/267.1 |
| 6,012,709 A | 1/2000 | Meatto et al. | |
| 2014/0284855 A1 | 9/2014 | Spiegel et al. | |
| 2015/0273963 A1 | 10/2015 | Zandbergen et al. | |
| 2016/0159181 A1 | 6/2016 | Hahn et al. | |
| 2017/0051808 A1* | 2/2017 | Bogrash | B60G 11/00 |

FOREIGN PATENT DOCUMENTS

| | | | | |
|---|---|---|---|---|
| DE | 102009054458 A1 * | 6/2011 | ....... | B60G 17/01941 |
| GB | 2514258 A | 11/2014 | | |

OTHER PUBLICATIONS

Saddu Smita C. et al. Modelling and Analysis of Composite as an Alternative Material for Leaf Spring. IOSR Journal of Mechanical and Civil Engineering. pp. 39-44. May-Jun. 2014. 6 pages.

German Patent and Trademark Office, German Examination Report for corresponding German Patent Application No. 10 2017 217 598.2 dated Oct. 20, 2020.

* cited by examiner

SPRING ASSEMBLY FOR A VEHICLE SUSPENSION

CROSS-REFERENCE TO RELATED APPLICATIONS

This application claims foreign priority benefits under 35 U.S.C. § 119(a)-(d) to DE Application 10 2017 217 598.2 filed Oct. 4, 2017, which is hereby incorporated by reference in its entirety.

TECHNICAL FIELD

The disclosure concerns a spring assembly with a leaf spring that extends in the vehicle longitudinal axis, supports a vehicle axle and is connected at least indirectly to a vehicle superstructure at a front end and at a rear end.

BACKGROUND

In a wheel suspension of modern motor vehicles, various types of springs are used via which an actual vehicle superstructure is connected to the wheels of the vehicle. As well as coil springs, amongst others, leaf springs are used, in particular on rigid axles. Such a leaf spring extends in a vehicle longitudinal axis, and usually has a concave form, e.g. in a manner of a parabola. As well as leaf springs made of spring steel, sometimes leaf springs are used that are made of composite material, e.g. fiber-reinforced plastic. Individual springs or spring packets with two or more springs may be used. The at least one spring is normally connected to the axle to be sprung in a central region, via a clamping device e.g. with spring clamps.

It is usual here for the vehicle superstructure to also be connected to the sprung axle via shock absorbers that are designed to prevent an undesirable vibration behavior of the vehicle superstructure relative to the vehicle axle. Such shock absorbers are normally configured as telescopic dampers in which a piston works inside a cylinder. Normally, the telescopic dampers are hydraulic dampers in which the cylinder is partially fluid-filled, but also for example air spring dampers are known. Such shock absorbers work reliably in principle, but increase an overall weight, and complicate a structure of the motor vehicle, which has an effect on installation and maintenance costs.

U.S. Pat. No. 6,012,709 A discloses a leaf spring of hybrid construction, comprising a non-elastomer, primary, leaf element attached to a vehicle frame. Furthermore, the leaf spring has at least one layer of a non-elastomer composite material, a modulus of elasticity of which differs from that of the primary leaf element. This layer is connected to the primary leaf element. The provision of different layers is intended to influence damping properties of the leaf spring.

The document by S. C. Saddu, V. V. Shinde: "Modelling and Analysis of Composite as an Alternative Material for Leaf Spring", IOSR Journal of Mechanical and Civil Engineering, describes a composition and properties of different leaf springs made from composite material. It reveals that such leaf springs have damping properties as well as springing properties.

DE 103 52 315 A1 discloses a spring/damper element with several mechanical spring/damper part elements, which can be coupled by interposed electro-rheological and/or magneto-rheological devices. At least two of said devices are configured such that an electro-rheological or magneto-rheological medium is loaded or deformed in a differing type of stress under an effect of operating load. Thus, a respective device may be operated in shear mode, crush mode or flow mode.

GB 2514258 A discloses a leaf spring assembly for a vehicle that has at least one leaf spring via which an axle is supported on a frame of the vehicle. A damper element is provided, both ends of which are connected to the leaf spring in order to reduce deformations of the leaf spring. The damper element may be designed e.g. as a hydraulic damper, and be arranged above or below the leaf spring.

US 2014/0284855 A1 describes a leaf spring made in composite construction, which comprises a thermoplastic material reinforced by inlaid fibers. An insert, which e.g. may be made of metal, may be embedded in the fiber-reinforced plastic material in a central region of the leaf spring.

US 2015/0273963 A1 discloses a single-wheel suspension for a rear axle of a motor vehicle with a transverse leaf spring, a damper and a wheel carrier, which is connected to a vehicle superstructure via movable connecting elements. The transverse leaf spring is attached in articulated fashion to one of the connecting elements. The transverse leaf spring may optionally be made of a composite material.

In view of the outlined prior art, a provision of a wheel suspension that guarantees advantageous springing and damping behavior with optimized weight and structure, leaves room for improvements.

SUMMARY

The disclosure is based on an object of providing a wheel suspension with advantageous springing and damping behavior, which is optimized in relation to weight and complexity.

It is pointed out that the features and measures listed individually in the description below may be combined with each other in any technically sensible fashion, and disclose further embodiments of the disclosure. The description characterizes and specifies the disclosure further, in particular in connection with the Figures.

The disclosure provides a spring assembly. This may in particular be part of a wheel suspension of a motor vehicle such as a truck or a car. However, use for trailers for example is also possible. Normally, the wheel suspension is used on an unsteered axle, i.e. typically a rear axle.

The spring assembly has a leaf spring that extends in a vehicle longitudinal axis, supports a vehicle axle and is connected at least indirectly to a vehicle superstructure at a front end and at a rear end. In other words, the leaf spring serves for elastic suspension of the vehicle axle relative to the vehicle superstructure. The term "vehicle superstructure" serves as a collective term for a body, a chassis and in some cases a subframe of a respective vehicle, i.e. parts that normally form the sprung mass. Connection between the leaf spring and the vehicle superstructure is normally a pivotable connection. In a known fashion, bearing eyes may be formed at the front and rear ends of the leaf spring, in which for example rubber-metal bushings may be pressed. A respective bearing eye, or the bushing arranged therein corresponds to a position of an axle bolt on the superstructure side, via which a rotatable connection is created. The axle bolt may be arranged stationarily on the superstructure or, as in the case of a Hotchkiss suspension, be arranged on a connecting arm, which connecting arm is arranged pivotably on the superstructure.

The leaf spring may consist of composite material and in particular at least partially consist of a fiber composite material. Fiber composite materials here are all materials in which fibers, e.g. glass fibers, carbon fibers and/or aramide fibers, are embedded in a polymer matrix (e.g. a plastic or synthetic resin matrix) for reinforcement. Optionally, further particles, layers or components may be embedded or applied that are not classed as polymers or fibers.

The leaf spring extends in an X-axis of the vehicle, wherein generally, at least in an unloaded state, the leaf spring does not run parallel to the X-axis, but has a concave curvature, e.g. in the manner of a parabolic spring. All references to the X-axis (longitudinal axis), Y-axis (transverse axis) and Z-axis (vertical axis) of the vehicle, here and below, relate to a correctly installed state of a spring assembly.

The connection to the vehicle axle, which in particular may be formed as a rigid axle, is normally ensured via a clamping device, which e.g. may have an upper and a lower clamping element that may be formed comparatively rigidly, e.g. made of steel. The lower clamping element may be connected rigidly, e.g. by substance bonding, to the vehicle axle. The two clamping elements are arranged above or below the leaf spring, wherein elastic isolating elements may be interposed. Such isolating elements may in particular consist of an elastomer, e.g. rubber or silicon. The primary function of such isolating elements is to better distribute pressure on to the leaf spring, so as to avoid very uneven loads. Spring clamps may be used to clamp the clamping elements together.

According to the disclosure, at least one damping region that is at least partially fluid-filled is integrated in the leaf spring. Such a damping region may take up a small part of a total volume of the leaf spring (e.g. between 10% and 30%) or a large part (e.g. between 40% and 70%). The term "fluid-filled" expressly includes a possibility of an emulsion of non-miscible fluids, and/or solid bodies suspended in the fluid. The damping region is at least partially fluid-filled, i.e. in the damping region, at least one recess is formed inside the leaf spring to receive the fluid. Such a recess may be formed inside a spring body of the leaf spring, e.g. a body made of fiber-reinforced plastic. In order to prevent an escape of fluid, the recess is evidently closed. The recess may e.g. be created directly on formation of a spring body, and/or by material removal or machining without material removal. Connecting processes may also be used to form the recess, e.g. such that a closing element is glued to the spring body, which closes the recess. The structures according to the disclosure provide damping by a favorable arrangement of fluid-storing, spherical structures, preferably in a region of edge zones of a leaf spring that are subjected to greatest deformations on suspension movements. The fluid may suitably be pressed through thin flow channels whereby damping work is performed.

The spring body, i.e. a part of the leaf spring formed as a solid body, is here elastically deformable, and primarily responsible for an actual springing property. In contrast, the fluid inside the damping region is primarily responsible for damping a vibration behavior of the leaf spring, and the fluid may also influence an elasticity or stiffness of the spring. Any vibration of the spring is accompanied by spring deformation, which usually also entails deformation of the damping region. Deformation of the damping region in turn leads, at least in regions, to a compression, expansion and/or displacement of the fluid. These processes, which normally occur in combination with each other, mean that mechanical energy is converted into heat, which results in a damping of the vibration behavior. In particular, fluid displacement, which causes an eddying inside the fluid, or friction between the fluid and a surrounding solid body, contributes to converting kinetic energy into heat.

Thus, the leaf spring forms a combined spring-damper element, which at least partially suppresses an undesirable vibration behavior. Normally therefore, a separate shock absorber may be omitted, whereby weight and number of components of the spring arrangement can be reduced, which has an advantageous effect on the cost of assembly and maintenance.

Preferably, the leaf spring has a spring portion, which is concave at least in portions and is adjoined by a connecting arm running at an angle thereto and connected pivotably to the vehicle superstructure. The spring portion, at least in an unloaded state and normally also in a loaded, but not compressed state, is configured to be upwardly concave, at least in portions and usually, completely. On suspension compression, the spring portion may be completely stretched or even transformed into a convex shape. The connecting arm here serves primarily to compensate for a change in distance between ends of the spring portion, which results from deformation. The connecting arm may have a lower elasticity than the spring portion, or—due to an arrangement and nature of the connection—may even undergo a negligible elastic deformation. However, it is expressly also possible that the connecting arm is (non-negligibly) elastically deformed on suspension compression.

According to a structure that resembles a conventional Hotchkiss suspension, the connecting arm as a separate component may be connected firstly in articulated fashion to a rear end of the leaf spring, and secondly in articulated fashion to the vehicle superstructure. In this case, the connecting arm may e.g. be made of steel or also composite material. According to an alternative embodiment, the connecting arm is formed by a connecting portion configured integrally with the spring portion. This means that the connecting portion and the spring portion are integrally formed parts of the leaf spring, which in this case is typically made of composite material. To this extent, the term "integral" expressly includes a possibility that the leaf spring, and hence also both said portions, are composed from several components usually connected together by substance bonding. An integral formation of the spring portion and the connecting portion is particularly advantageous since a number of parts is reduced. There is no need for a separate connecting arm, and also any components for articulated connection of the connecting arm to the leaf spring may be omitted. In this embodiment, normally a connecting portion is elastically deformable, in particular by bending, on suspension compression.

According to a preferred embodiment, at least one damping region comprises an electro-rheological or magneto-rheological fluid. An electro-rheological fluid is a fluid of which rheological properties, in particular viscosity, can be influenced by an electrical field. Accordingly, a magneto-rheological fluid is a fluid of which rheological properties, in particular viscosity, can be influenced by a magnetic field. Thus, it is possible to influence mechanical properties of the damping region by application of an electrical or magnetic field. Qualitatively, on an increased viscosity of the fluid in the damping region, this behaves similarly to a solid body, whereby the leaf spring behaves to a greater extent as a pure spring element. On a lower viscosity of the fluid, however, damping properties may be more pronounced. It is understood that for example solid bodies may also be suspended in the respective fluid, and/or an emulsion with other fluids may be present. This includes also so-called heterogeneous electro-rheological fluids in which particles are suspended in a fluid, or droplets of another fluid are emulsified therein in order to create an electro-rheological property.

Advantageously, at least one damping region is arranged between two layers that are at least partially conductive and can be charged electrically in order to influence the rheological properties of the fluid in the damping region. Said layers are normally at least partially metallic in order to create conductivity. The layers may, in principle, also be made at least partially of spring steel and hence influence the mechanical properties of the leaf spring. The two layers may be arranged above and below the damping region; however, an arrangement is also conceivable in which the two layers lie opposite each other in a horizontal direction relative to the damping region. In any case, the damping region is effectively enclosed by the two layers. In the case of an electro-rheological fluid inside the damping region, the electrical charging of the conductive layers is achieved by application of a voltage, i.e. a potential difference, between these layers, so that an electrical field is produced inside the damping region. In the case of a magneto-rheological fluid inside the damping region, electrical charging is achieved by an electrical current flowing through the layers, so that a magnetic field is produced inside the damping region. In this case, under certain circumstances, current may flow only through one layer while an opposite layer remains free from current. The damping region may be structured in various ways such as:

electromagnetic particles evenly distributed in a base material of an entire leaf spring;

individual electromagnetic layers, preferably in the edge regions of the leaf spring loaded with tension or compression;

closed spaces filled with electro-rheological or magneto-rheological fluid and evenly distributed in the base material of the entire leaf spring;

closed spaces filled with electro-rheological or magneto-rheological fluid and preferably arranged in the edge regions of the leaf spring loaded with tension or compression.

According to a preferred embodiment, the damping region comprises a plurality of at least partially fluid-filled recesses, which follow each other in an extension direction of the leaf spring. The extension direction of the leaf spring may also be called a longitudinal direction, and corresponds to a concave course within the above-mentioned spring portion. The recesses are at least partially filled with a fluid that optionally, as outlined above, may have magneto-rheological or electro-rheological properties. This is not however essential, and the fluid may for example be a fluid also used in conventional hydraulic dampers. To prevent an escape of fluid, the recesses are evidently closed. Advantageously, at least some of the recesses, in particular all recesses, are completely fluid-filled. This means that no gas, or in any case only a negligible volume of gas, is enclosed with the fluid.

According to a preferred embodiment, at least some of the recesses are formed elongate and run at an angle of at least 45° to an extension direction. The term "elongate" means that a dimension in a direction that could be called a running direction is significantly greater than a dimension transversely to the running direction. In particular, a length in the running direction may be at least three times, four times or five times greater than a transverse dimension transversely to the running direction. The running direction—which may in some cases change along a respective recess—runs at an angle of at least 45° to the extension direction of the leaf spring. The angle may furthermore be at least 60°, at least 80° and in particular 90°. The running direction is normally arranged at an angle (i.e. non-parallel) to the X-Y plane and may in particular lie at least mostly inside the X-Z plane. Because of an elongate formation of the respective recess, its cross-section is comparatively small in relation to the enclosed fluid volume, whereby friction losses are amplified when fluid flows inside the recess from one end to the other. Thus, damping behavior is amplified. Furthermore, on suspension compression, upper parts of the leaf spring are expanded while lower parts are compressed. This means that parts of the leaf spring that show the greatest discrepancies in relation to mechanical stress, are spaced apart from each other in the X-Z plane transversely to the extension direction. If an elongate recess as described runs at an angle to the extension direction, elongate recess ends are subjected to relatively large pressure differences, whereby a fluid exchange between elongate recess ends is amplified.

A form of the recesses may be optimized if at least some of the recesses have two reservoir regions at the ends, which widen out and are connected by a connecting channel that is constricted at least in portions. The reservoir regions are widened, i.e. a cross-section is larger in comparison with respective adjacent regions of a connecting channel. Conversely, the connecting channel is at least partially, preferably, completely constricted in relation to the reservoir regions. On suspension compression and extension, because of mechanisms described above, fluid is exchanged between the reservoir regions located at the ends, wherein the fluid must flow through the connecting channel. Because of the constricted cross-section of the connecting channel, friction inside the fluid and between the fluid and a wall of the connecting channel is comparatively strong, whereby the damping behavior is amplified. A transverse dimension of the respective reservoir region may be at least 1.5 times or at least twice a transverse dimension of the connecting channel. The connecting channel may have a circular cross-section. The cross-section may vary in shape and size along the connecting channel, and in portions may even exceed that of the reservoir regions. In order to distribute mechanical stress as evenly as possible in material adjacent to the reservoir regions, it is preferred that the reservoir regions are formed ball-shaped, in particular spherical.

Corresponding to a preferred running direction of the recesses, it is preferred if, at least in some of the recesses, the reservoir regions are spaced apart along the vehicle vertical axis. This spacing along the vehicle vertical axis ensures that, on suspension compression and extension, the reservoir regions are exposed to different pressure changes as a result of different deformations of the adjacent regions of the leaf spring. Thus, on suspension compression, an upper reservoir region is expanded while a lower reservoir region is compressed. In addition, it is possible that the reservoir regions are spaced along the vehicle longitudinal axis and/or the vehicle transverse axis.

It has been found that the recesses may be arranged comparatively close together without this having a disadvantageous effect on the mechanical properties of the leaf spring. In this way, a large number of recesses may be provided in the leaf spring, which has a further advantageous effect on the damping behavior. Thus, it is advantageous if a distance between two recesses is smaller than a thickness of the leaf spring transversely to the extension direction. In particular, the thickness may be at least twice or at least three times the distance.

Further advantageous details and effects of the disclosure are explained in more detail below in relation to an exemplary embodiment shown in the Figures. The drawings show:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the various figures, the same parts always carry the same reference signs so these are usually only described once.

Figure 1:
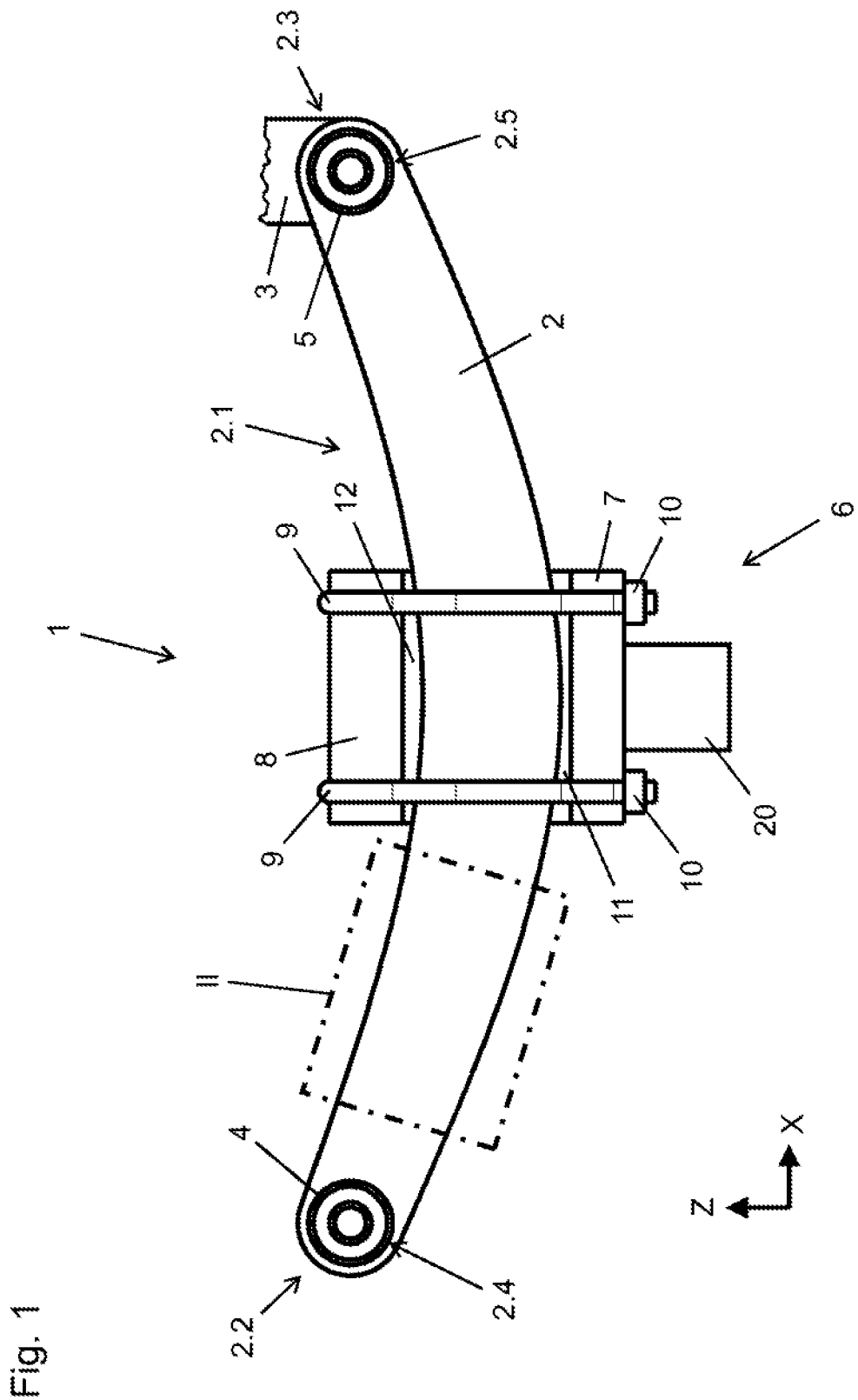
FIG. 1 depicts a side view of a spring assembly according to the disclosure in a first embodiment.

FIG. 1 shows a first embodiment of a spring assembly 1, which may be used for example in a truck. A rear axle 20, formed as a rigid axle, is connected to a vehicle superstructure (not shown) by a leaf spring 2. While the rear axle 20 extends parallel to the Y-axis, the leaf spring 2 extends along the X-axis, predominantly not parallel thereto but with a concave curvature within the X-Z plane. The leaf spring 2 has a concave, spring portion 2.1, a first bearing eye 2.4 at a front end 2.2, and a second bearing eye 2.5 at a rear end 2.3. A first rubber-metal bushing 4 is pressed into the first bearing eye 2.4, via which the leaf spring 2 is connected pivotably to the vehicle superstructure. A second rubber-metal bushing 5 is pressed into the second bearing eye 2.5, via which the leaf spring 2 is connected pivotably to a connecting arm 3, which is made e.g. from steel and is in turn connected pivotably to the vehicle superstructure. The function of the connecting arm 3 is to allow for a change in distance between the ends 2.2, 2.3 on deformation of the leaf spring 2.

The leaf spring 2 is connected to the rear axle 20 via a clamping device 6. A lower clamping element 7 is clamped to an upper clamping element 8 by spring clamps 9 and nuts 10 assigned thereto, and at the same time welded to the rear axle 20. Both clamping elements 7, 8 in this case consist of steel. The leaf spring 2 is clamped between the clamping elements 7, 8 with the interposition of damper cushions 11, 12, which are made of rubber.

Figure 2:
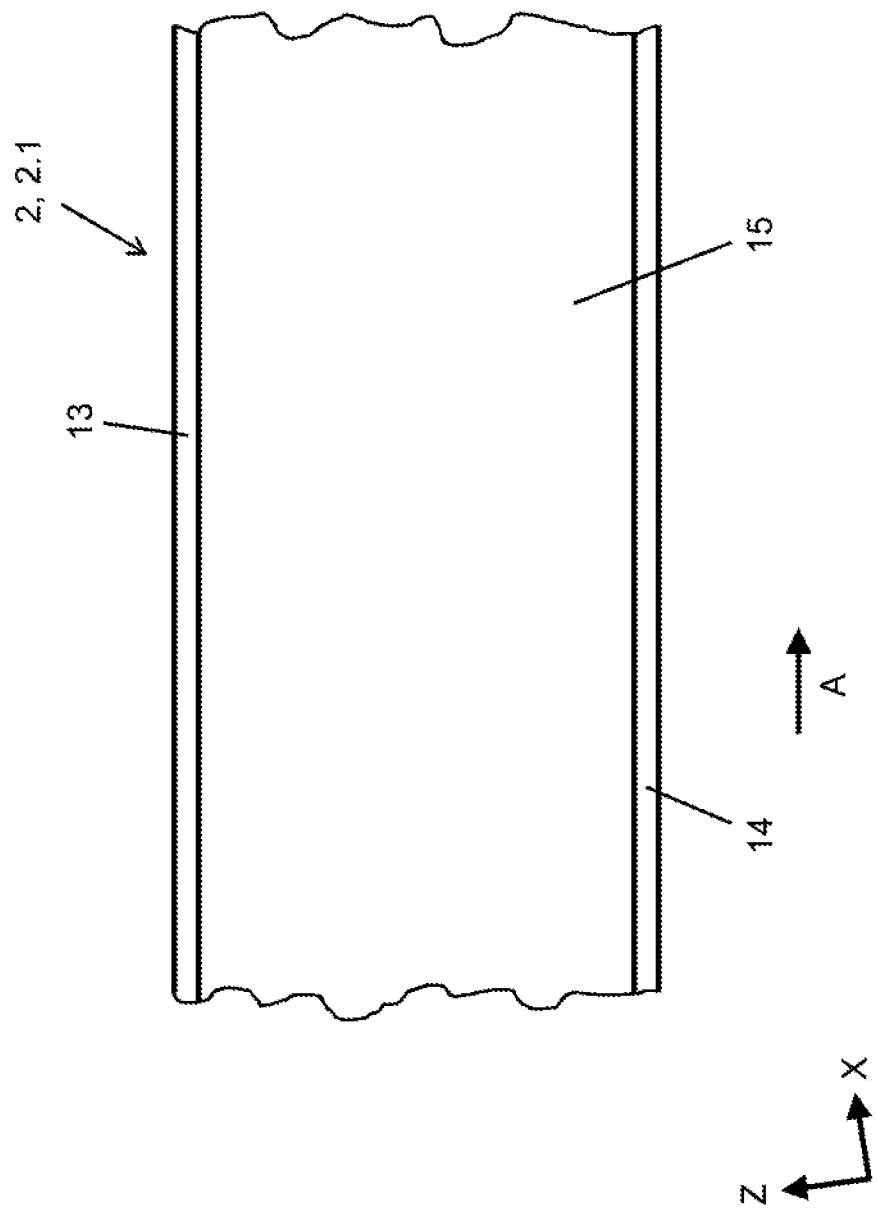
FIG. 2 depicts a sectional depiction of extract II from FIG. 1.

FIG. 2 shows a sectional drawing in the X-Z plane and depicts a portion of the leaf spring 2. Above and below the leaf spring 2, a first metal layer 13 and a second metal layer 14 can be seen, between which a damping region 15 is arranged. The latter is partially filled with an electro-rheological fluid or a magneto-rheological fluid, wherein a more, precise, inner structure of the damping region 15 is not shown. The metal layers 13, 14 influence an elasticity or stiffness of the leaf spring, and thus contribute directly to spring behavior. It is also provided that the metal layers 13, 14 may be electrically charged (by a voltage source not shown here). In the case of an electro-rheological fluid in the damping region 15, a voltage may be applied between the first metal layer 13 and the second metal layer 14, so that an electrical field is produced inside the damping region 15. In the case of a magneto-rheological fluid in the damping region 15, it is provided that current flows through at least one, and preferably both, metal layers 13, 14, whereby a magnetic field is produced inside the damping region 15. In any case, the rheological properties of the fluid, in particular viscosity, are changed by a resulting field.

On suspension compression of the rear axle 20, the leaf spring 2 is deformed, which affects the damping region 15. The fluid enclosed therein is expanded, compressed and/or displaced by this deformation. These processes lead to kinetic energy being converted into heat, and hence to a damping of vibration behavior. An intensity of damping may be influenced by viscosity of the fluid and hence by an applied electrical or magnetic field. However, the elasticity or stiffness of the leaf spring 2 is also influenced by the viscosity of the fluid. Thus, at high viscosity, the fluid behaves more like a solid body, whereby in general a stiffness of the leaf spring 2 is increased. Thus, it is possible to adjust both the stiffness of the leaf spring 2 and leaf spring damping by adjusting the electrical or magnetic field.

Figure 3:
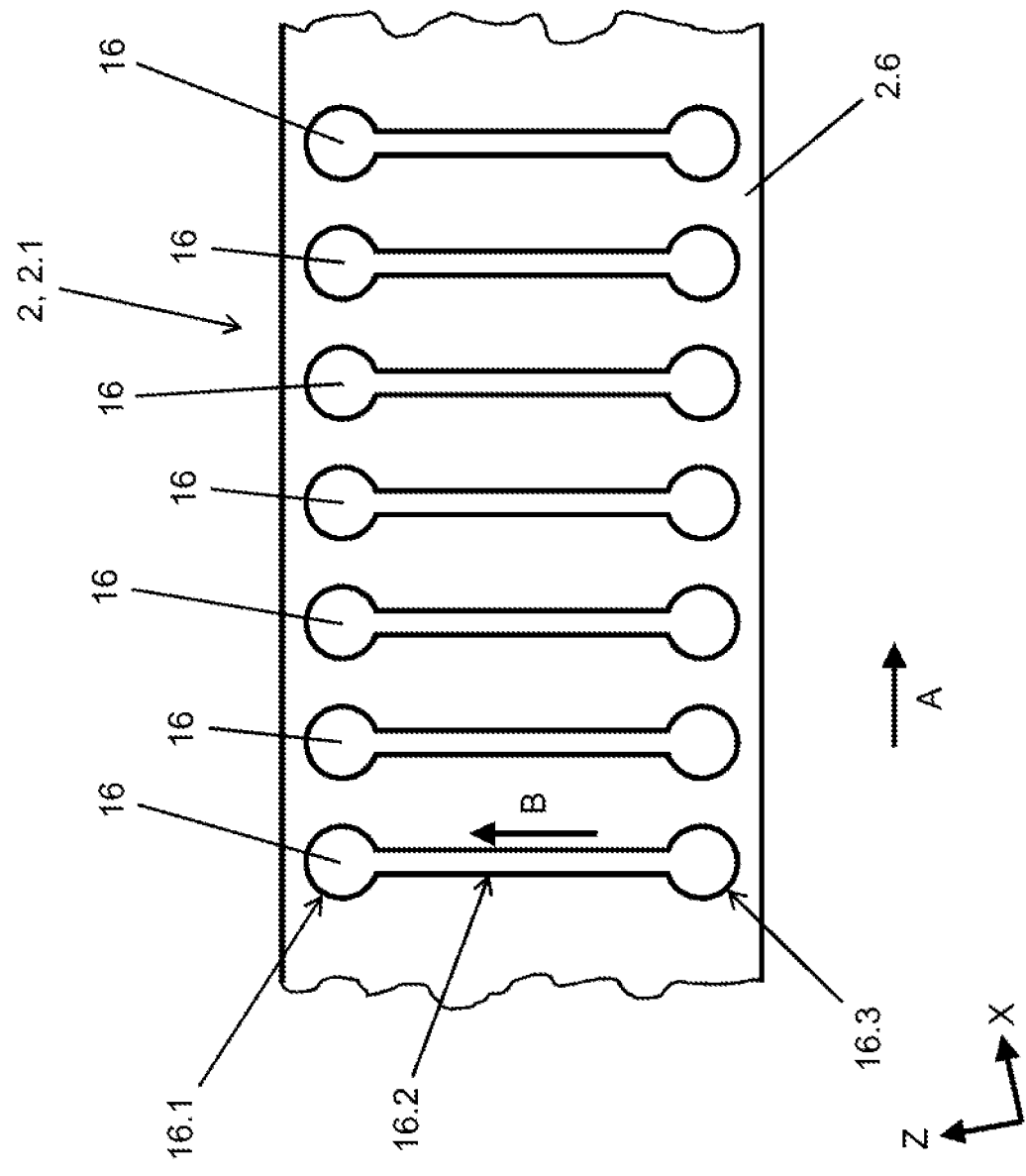
FIG. 3 depicts a sectional depiction corresponding to FIG. 2 in a second embodiment.

FIG. 3 shows a sectional drawing corresponding to FIG. 2 in an alternative embodiment of the leaf spring 2. In this case, practically an entire volume of the leaf spring 2 is formed by a damping region 15, which however has a specific structure. A series of recesses 16 is formed inside a solid body 2.6 made of fiber-reinforced plastic. Each of the recesses 16 is formed elongate, transversely or perpendicularly to an extension direction A of the leaf spring 2. More precisely, the recesses 16 are formed following a running direction B, which runs at an angle of 90° to the extension direction A of the leaf spring 2. In the present example, all recesses 16 are formed identically. A distance between two recesses 16 in the present example amounts to around 20 to 25% of a thickness of the leaf spring 2, i.e. its dimension transversely to the running direction A. At an end, each recess 16 has an upper reservoir region 16.1 and a lower reservoir region 16.3, which are connected together by a straight connecting channel 16.2. The reservoir regions 16.1, 16.3 are widened in comparison with the connecting channel 16.2, or the connecting channel 16.2 is constricted relative to the reservoir regions 16.1, 16.3. A dimension of the reservoir regions 16.1, 16.3 transversely to the running direction B is around twice that of the connecting channel 16.2. The reservoir regions 16.1, 16.3 are formed spherical, and the connecting channel 16.2 has a circular cross-section. Each recess 16 is filled with a hydraulic fluid, wherein preferably no air or other gases are enclosed. During a production process of the leaf spring 2, the hydraulic fluid may be inserted through an opening, which is connected by substance bonding to the spring body 2.6 via a closing element.

On suspension compression of the leaf spring 2, an upper part of the spring body 2.6 (in the direction of the Z-axis) undergoes an expansion while a lower part undergoes a compression. This leads firstly to a resetting, spring force, and secondly the respective lower reservoir region 16.3 is compressed while the reservoir region 16.1 is expanded. This leads to fluid flowing through the connecting channel 16.2 into the upper reservoir region 16.1, wherein because of a comparatively narrow cross-section of the connecting channel 16.2, a strong friction occurs inside the fluid and between the fluid and the wall of the connecting channel 16.2. This in turn leads to part of kinetic energy being converted into heat, and hence a vibration of the leaf spring 2 (and hence of the spring assembly 1) is reduced. On suspension extension, the upper reservoir region 16.1 is compressed and the lower reservoir region 16.3 expanded, whereby again fluid flows through the connecting channel 16.2. Here again, kinetic energy is converted into heat and undesirable vibration behavior is reduced.

Although a configuration in FIG. 3 here depicts an exemplary embodiment separate from that of FIG. 2, it may be sensible to combine the two embodiments in that the damping region 15 shown in FIG. 2 is structured as shown in FIG. 3.

Figure 4:
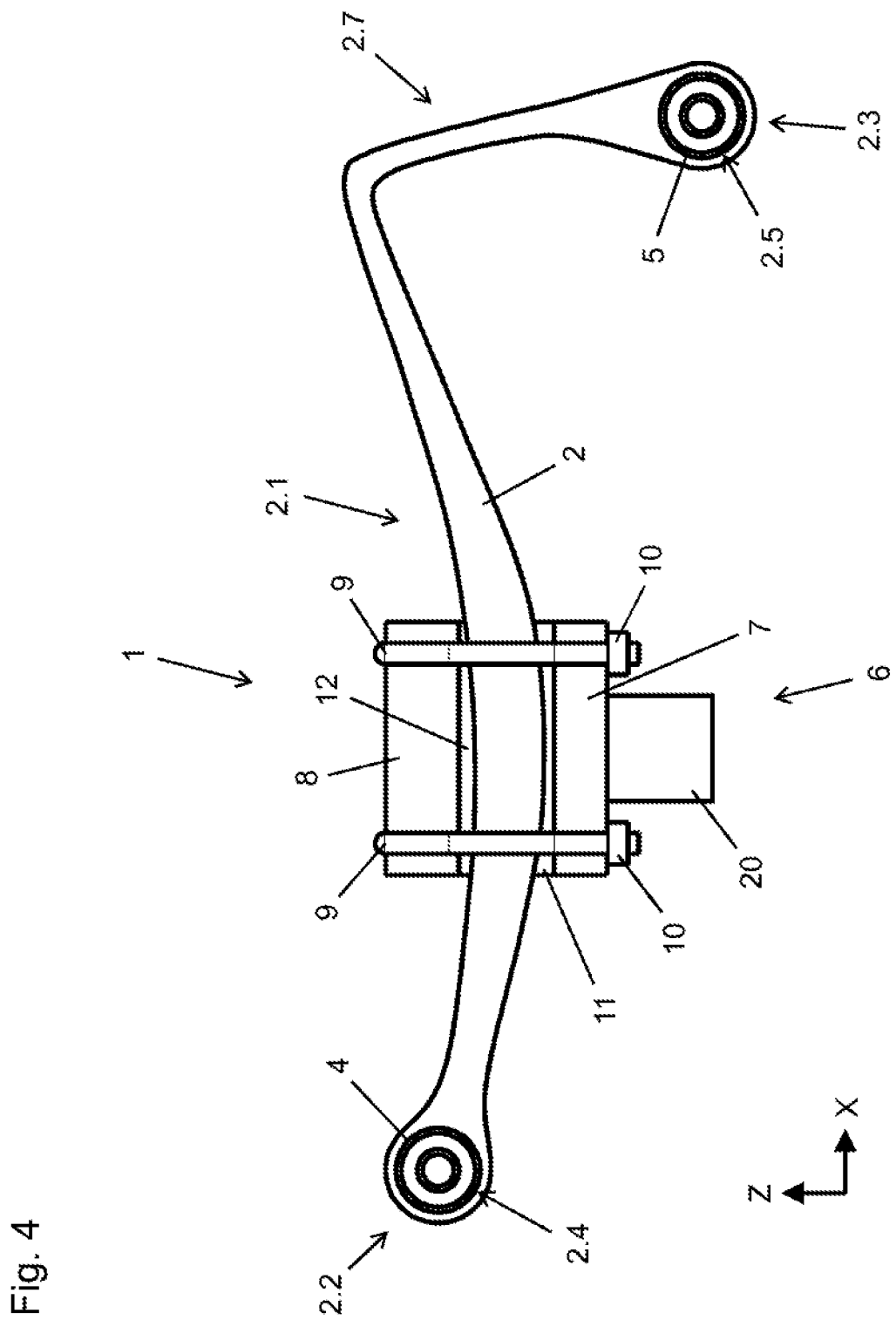
FIG. 4 depicts a side view of the spring assembly according to the disclosure in a third embodiment.

FIG. 4 shows a further embodiment of the spring assembly 1, a structure of which resembles that of the embodiment shown in FIG. 1 and to this extent is not described again. However, in this embodiment, there is no separate connecting arm 3, but a concave spring portion 2.1 is adjoined by a connecting portion 2.7, which runs at an angle of approximately 90° thereto and on which the rear bearing eye 2.5 is formed, in which the second rubber-metal bushing 5 is pressed. The connecting portion 2.7 is connected to the vehicle superstructure via the second, rubber-metal bushing 5. This means that in this case, a function of the connecting arm 3 is integrated in the leaf spring 2. A necessary length compensation, which must be provided for suspension compression and extension, takes place via an elastic deformation of the connecting portion 2.7 and an elastic kinking of the connecting portion 2.7 relative to the spring portion 2.1. With the leaf spring 2 shown in FIG. 4, the damping mechanisms according to FIGS. 2 and 3, or mixtures thereof may be provided. Optionally, it is possible that a damping region 15 is restricted to the spring portion 2.1, while the connecting portion 2.7 is formed for example as a solid body of fiber composite material.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A spring assembly comprising:
a leaf spring that extends in a vehicle longitudinal axis, supports a vehicle axle and is connected at least indirectly to a vehicle superstructure at a front end and at a rear end, the leaf spring having at least one damping region comprising a plurality of at least partially fluid-filled recesses integrated in the leaf spring and following each other in an extension direction of the leaf spring, wherein at least one of the recesses comprises two reservoir regions connected by a connecting channel constricted at least in portions.

2. The spring assembly as claimed in claim 1, wherein the at least one damping region includes an electro-rheological fluid.

3. The spring assembly as claimed in claim 1, wherein at least some of the plurality of recesses are formed elongate and run at an angle of at least 45° to the extension direction.

4. The spring assembly as claimed in claim 1, wherein in at least some of the plurality of recesses and the reservoir regions are spaced apart along a vehicle vertical axis.

5. The spring assembly as claimed in claim 1, wherein a distance between two recesses of the plurality of recesses is smaller than a thickness of the leaf spring transverse to the extension direction.

6. The spring assembly as claimed in claim 1, wherein the leaf spring has a spring portion that is concave at least in portions and adjoined by a connecting arm running at an angle thereto, and the connecting arm is connected pivotably to the vehicle superstructure.

7. The spring assembly as claimed in claim 6, wherein the connecting arm is formed by a connecting portion configured integrally with the spring portion.

8. A vehicle comprising:
a wheel suspension having a spring assembly with a leaf spring that extends in a vehicle longitudinal axis, supports a vehicle axle and is connected at least indirectly to a vehicle superstructure at a front end and at a rear end, wherein at least one damping region is integrated in the leaf spring, the damping region comprising a plurality of at least partially fluid-filled recesses that follow each other in an extension direction of the leaf spring, wherein at least one of the plurality of recesses comprises two reservoir regions connected by a channel constricted at least in portions; and
a connecting arm connected pivotably with the vehicle superstructure and running at an angle with respect to and adjoining a spring portion of the leaf spring that is concave at least in portions.

9. The vehicle as claimed in claim 8, wherein at least some of the plurality of at least partially fluid-filled recesses are formed elongate and run at an angle of at least 45° to the extension direction.

10. The vehicle as claimed in claim 8, wherein in at least some of the plurality of at least partially fluid-filled recesses and the reservoir regions are spaced apart along a vehicle vertical axis.

11. The vehicle as claimed in claim 8, wherein a distance between two recesses of the plurality of at least partially fluid-filled recesses is smaller than a thickness of the leaf spring transverse to the extension direction.

12. A vehicle wheel suspension comprising:
a spring assembly with a leaf spring that extends in a vehicle longitudinal axis, supports a vehicle axle, and is connected at least indirectly to a vehicle superstructure at a front end and at a rear end;
at least one damping region integrated in the leaf spring and comprising a plurality of recesses at least partially filled with a magneto-rheological fluid, wherein the recesses follow each other in an extension direction of the leaf spring, and wherein at least one of the recesses comprises two reservoir regions connected by a channel constricted at least in portions; and
a connecting arm being connected pivotably to the vehicle superstructure and running at an angle with respect to and adjoining a spring portion of the leaf spring that is concave at least in portions.

13. The vehicle wheel suspension as claimed in claim 12, wherein at least some of the plurality of at least partially filled recesses are formed elongate and run at an angle of at least 45° to the extension direction.

14. The vehicle wheel suspension as claimed in claim 12, wherein in at least some of the plurality of at least partially filled recesses and the reservoir regions are spaced apart along a vehicle vertical axis.

15. The vehicle wheel suspension as claimed in claim 12, wherein a distance between two recesses of the plurality of at least partially filled recesses is smaller than a thickness of the leaf spring transverse to the extension direction.

* * * * *